(12) United States Patent
Singh et al.

(10) Patent No.: US 10,473,476 B2
(45) Date of Patent: Nov. 12, 2019

(54) VEHICLE ROUTING GUIDANCE TO AN AUTHORITATIVE LOCATION FOR A POINT OF INTEREST

(71) Applicant: Uber Technologies, Inc., San Francisco, CA (US)

(72) Inventors: Shivendra Pratap Singh, Redwood City, CA (US); Daniel Wolf, San Francisco, CA (US); Gaurang Ramakant Khetan, Fremont, CA (US); Chandan Prakash Sheth, Fremont, CA (US)

(73) Assignee: Uber Technologies, Inc., San Francisco, CA (US)

( * ) Notice: Subject to any disclaimer, the term of this patent is extended or adjusted under 35 U.S.C. 154(b) by 151 days.

(21) Appl. No.: 15/396,445

(22) Filed: Dec. 31, 2016

(65) Prior Publication Data

US 2018/0188052 A1   Jul. 5, 2018

(51) Int. Cl.
*G01C 21/34* (2006.01)
*G01C 21/36* (2006.01)

(52) U.S. Cl.
CPC ..... *G01C 21/3476* (2013.01); *G01C 21/3679* (2013.01)

(58) Field of Classification Search
None
See application file for complete search history.

(56) References Cited

U.S. PATENT DOCUMENTS

| 2016/0069699 A1 | 3/2016 | Chen et al. |
| 2016/0203198 A1 | 7/2016 | Roytblat et al. |
| 2018/0014161 A1 | 1/2018 | Warren et al. |
| 2018/0188052 A1 | 7/2018 | Singh et al. |

*Primary Examiner* — John Olszewski
*Assistant Examiner* — Gerrad A Foster
(74) *Attorney, Agent, or Firm* — Fenwick & West LLP

(57) ABSTRACT

An authoritative candidate is selected for determining a location of a point of interest (POI). Source data including name and location for POIs is received from multiple data sources. The received data is normalized for ease of comparison, and coordinates for each candidate are compared to coordinates of other candidates to determine which candidates lie outside of a consensus set of candidates. A consensus set of candidates are those that are each located on a same side of a road segment. Candidates that are not part of the consensus set are eliminated from consideration. Further criteria are then applied to the consensus set of candidates. The authoritative candidate can be used to render digital maps that include the POI. In addition, the authoritative candidate's location can be used to provide vehicle route guidance to the POI.

20 Claims, 6 Drawing Sheets

US 10,473,476 B2

VEHICLE ROUTING GUIDANCE TO AN AUTHORITATIVE LOCATION FOR A POINT OF INTEREST

BACKGROUND

Field

The described embodiments relate generally to providing vehicle routing guidance to points of interest, and more particularly to selecting a particular location for a point of interest (POI) given multiple candidate locations.

Description of Related Art

Locations of objects (known often as points of interest, or POIs) on a digital map are typically specified using a coordinate system such as latitude and longitude. A data provider might report, for example, that a particular gas station is located at a specific latitude and longitude. Alternatively, the data provider might simply provide a street address for the POI, leaving it to the map generator to convert, or "geocode," the address into a coordinate system to place on the map.

In many real-world situations, there are multiple distributors of map data, and each may provide incomplete or different location information for a particular POI. This then requires the map renderer or other consumer of this location data to make a choice about which set of location data to give credence to. One way this is typically done is by identifying and removing outliers in the data—that is, discarding candidates who are more than some threshold distance away from the remaining candidates.

SUMMARY

Described embodiments enable selection of an authoritative candidate for determining a location of a point of interest. Source data including name and location for POIs is received from multiple data sources. The received data is normalized for ease of comparison, and if more than two candidate locations for a POI exist, coordinates for each candidate are compared to coordinates of other candidates to determine which candidates lie outside of a consensus set of candidates. A consensus set of candidates are those that are each located on a same side of a road segment. Candidates that are not part of the consensus set are then eliminated from further consideration. Further criteria are then applied to the consensus set of candidates to select from among them an authoritative candidate. The authoritative candidate can be used to render digital maps that include the POI. In addition, the authoritative candidate's location can be used to provide vehicle route guidance to the POI.

Additional features of the various embodiments are described further below, and nothing in this summary is intended as limiting in scope, or as indicating that a particular feature is essential or otherwise required.

DETAILED DESCRIPTION

One use case we explore here for purposes of illustrating various embodiments is involves a travel coordination systems. Other use cases exist—in general, any application that benefits from having knowledge of a POI's location with respect to nearby road segments—and the particular examples that flow throughout this description should be understood to be given for ease of illustration, and not as a limitation of scope.

Considering this example use case then, assume a user of a transportation coordination system's client application, whom we shall refer to as a rider, wants to secure a ride from some first location, and to be dropped off at the Has Bean Coffee Shop in Las Vegas, Nev. While it may be possible that the rider knows the actual and precise latitude and longitude of the drop off point, it is more likely—and we assume, for purposes of this discussion—that the rider knows only the name and perhaps the general location of the coffee shop. Once the rider enters this information into the client software, or in a variation of the use case, tells the driver the information, the correct location of the Has Bean Coffee Shop in Las Vegas has to be determined so that the driver can be provided with accurate navigation directions to the correct drop off point.

A problem arises when there are multiple sources of data—such as multiple providers of name/location matching information—that give conflicting information about the precise location of a particular point of interest. There may be variation in the name of the point of interest, for example—"Has Bean Coffee Shop," "Has Bean Coffee," and "Has Bean Shop" might be names provided by three different data sources to refer to the same actual retail establishment. Similarly, the addresses provided by vendors may not match, and the latitude/longitude or other coordinates provided by the vendors may not match the actual coordinates of the street address, even if the street address is correct.

While this problem could potentially be avoided by better data curation on the part of vendors, we assume that the problem exists as it does today—that is, the data about POI locations supplied by different vendors is often inconsistent, and frequently wrong. Given that inconsistency, a number of different possible locations for the POI may exist, and one has to be chosen as authoritative before navigation routing can be performed. The question then is how to choose an authoritative candidate from among these different candidate locations for a particular POI.

Figure 1:
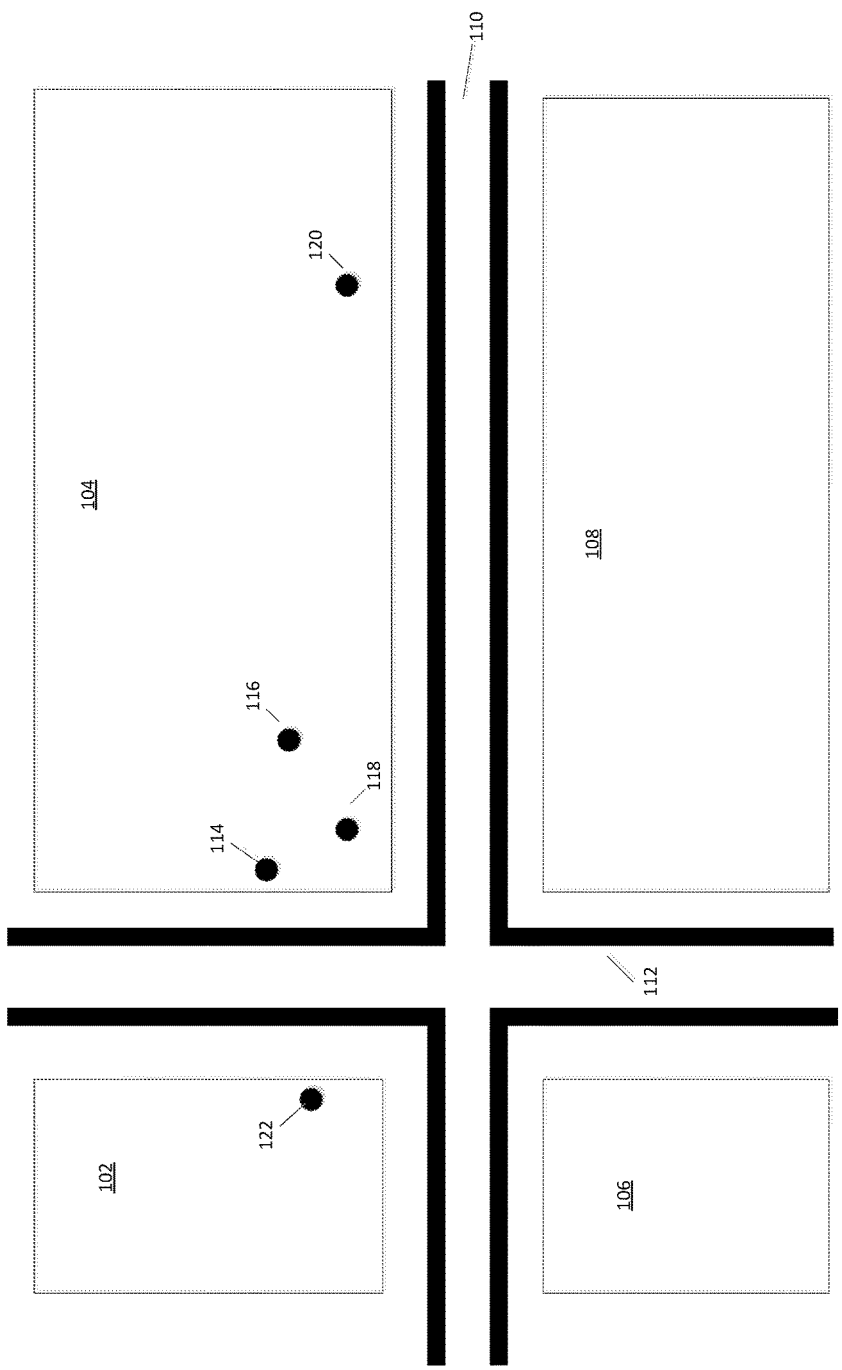
FIG. 1 illustrates an example of multiple potential candidate locations for a point of interest according to one embodiment.

As noted above, one solution to this problem has been to identify candidate points that are outliers—that is, they are too far from the other candidate points to be considered potentially correct. For example, FIG. 1 illustrates four street blocks, 102, 104, 106, 108, defined by the intersection of two streets 110, 112. FIG. 1 also illustrates 114, 116, 118, 120, 122, five potential candidate locations for the relevant point of interest, which in this example is the Has Bean Coffee Shop.

As can be seen in FIG. 1, candidate point 120 is a distance outlier, located relatively far from the remaining candidate points 114, 116, 118, 122. Using methods that simply neglect distance outliers, candidate point 120 would be dropped from consideration when choosing the ultimate authoritative location, and one of the remaining four candidates would be chosen instead. Candidate point 122, using such a method, would be retained for further consideration.

Unlike the methods just described, embodiments described herein take into account an analysis of whether candidate points are on the same side of a road segment, or whether they are across the road segment from other points. We refer to candidate points that are on opposite sides of a road segment as "across the road," or "XTR" points.

For example, candidate point 122 is much closer to candidates 114, 116 and 118 than is candidate point 120, and as noted above could easily survive a distance outlier test unscathed. But, from a travel coordination system user's perspective, being dropped off at point 122 would represent significantly more inconvenience than being dropped off at point 120, assuming that the actual position of the POI was one of 114, 116 or 118—in the case of a drop off at point 122, the rider would be forced to cross the intersection, which could be time-consuming at least, and dangerous at worst. Furthermore, a navigation algorithm used to guide the driver to the drop off point would consume unnecessary time in routing the driver and rider to a point on the wrong side of the intersection, which might add cost as well as inconvenience to both parties. By identifying and eliminating from consideration candidate points such as point 122, that are across a road segment from multiple alternatives, this hazard can be eliminated.

Figure 2:
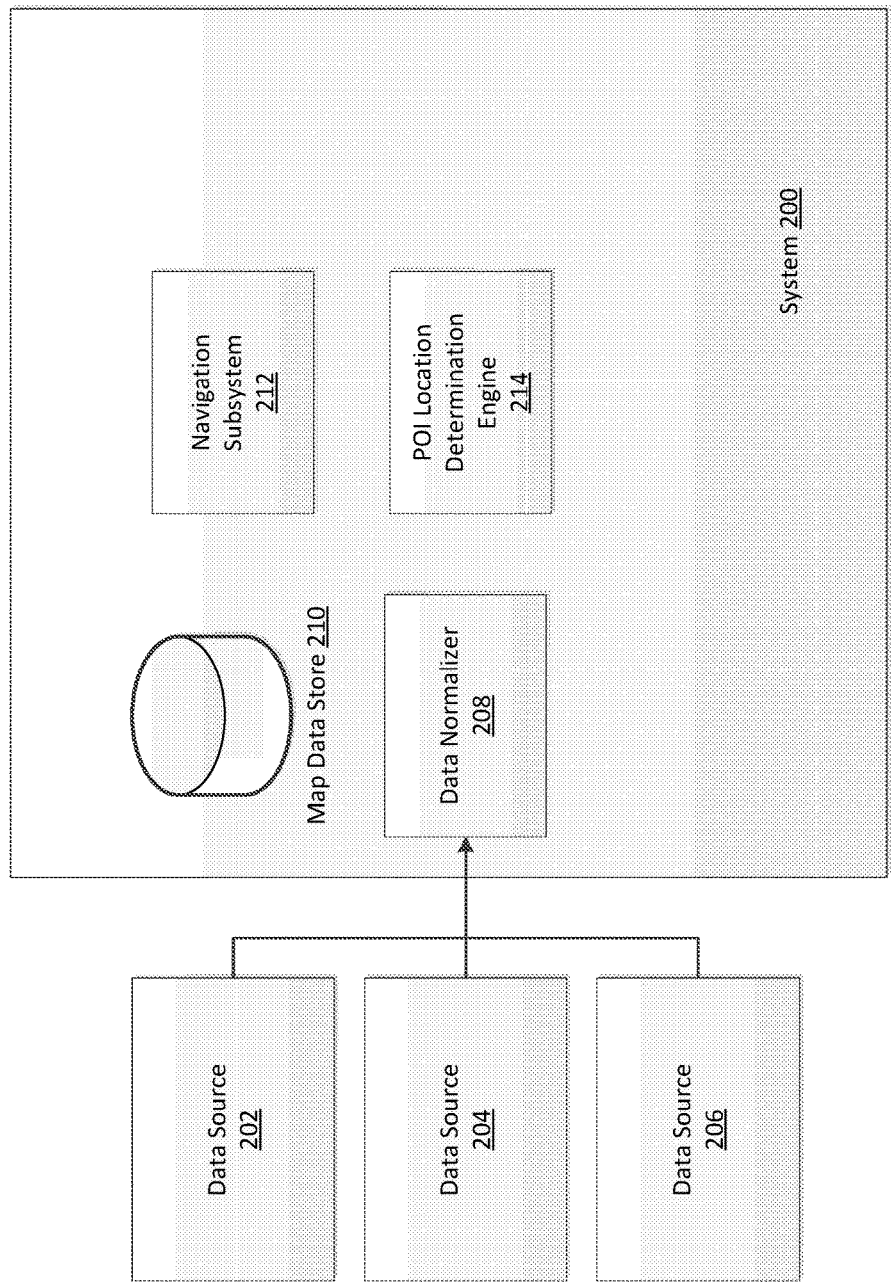
FIG. 2 illustrates a system for determining an authoritative location of a point of interest in accordance with one embodiment.

FIG. 2 illustrates a system 200 in accordance with one embodiment for determining an authoritative location of a POI. Multiple sources 202, 204, 206 of POI data provide their data to a data normalizer 208 of system 200. Although only three data sources are shown for illustrative ease, any number of source providers can be used. In some embodiments, individual users can be data providers, allowing crowd-sourcing to be taken advantage of. Alternatively, or in addition to crowd-sourced data, curated data can be provided by multiple vendors, for example as part of a commercial relationship. Typically, this data includes at least a name, address and coordinates of the POI, and may additionally include other information, e.g., opening times, pricing, and the like. Data from these providers can be accessed programmatically, for example via web-based interfaces.

Data normalizer 208 receives the POI data from the data sources 202, 204, 206 and normalizes it. For example, data may be reported by the data sources in different formats having different file types, naming conventions, address specifications, coordinate systems, and the like. Normalization allows data from the various sources to be compared against each other for purposes of identifying which candidate should be considered authoritative. In one embodiment, Apache Thrift's mapfeature interface can be used to assist with data normalization.

Map data source 210 includes base map data and road network data. Base map data includes feature information that is typically used to render a digital map, and the particular features included in the data source 210 can vary in different embodiments depending on the desire of the implementer and the purpose for which the map is being used. Data source 210 includes road network data, which describes networks of road segments and navigation rules for the segments, which allows a navigation subsystem 212 to provide routing guidance from a first location to a second location.

Navigation subsystem 212 provides, as noted, routing guidance from a first location to a second location. In one embodiment, and as contemplated in the use case example described here, navigation subsystem 212 is part of a travel coordination system that connects riders with drivers so that drivers can provide riders with trips from a first location to a second location (in this case, a POI). In other embodiments, navigation subsystem 212 is not part of a travel coordination system, and instead provides navigation data to the POI for any driver on request, or as part of a service offered by an implementer of system 200 directly to drivers or to intermediaries who in turn provide such a service to drivers. Note also that while we refer to "drivers" throughout this description, the described embodiments have equal application to providing routing information to pedestrians and cyclists.

POI location determination engine 214 uses the normalized POI data received from the various data sources, in combination with the base map data and road network information from map data source 210 to select an authoritative candidate to use when providing navigation routing to a driver and for rendering on a map, for example on a driver's device or rider's device.

Figure 3:
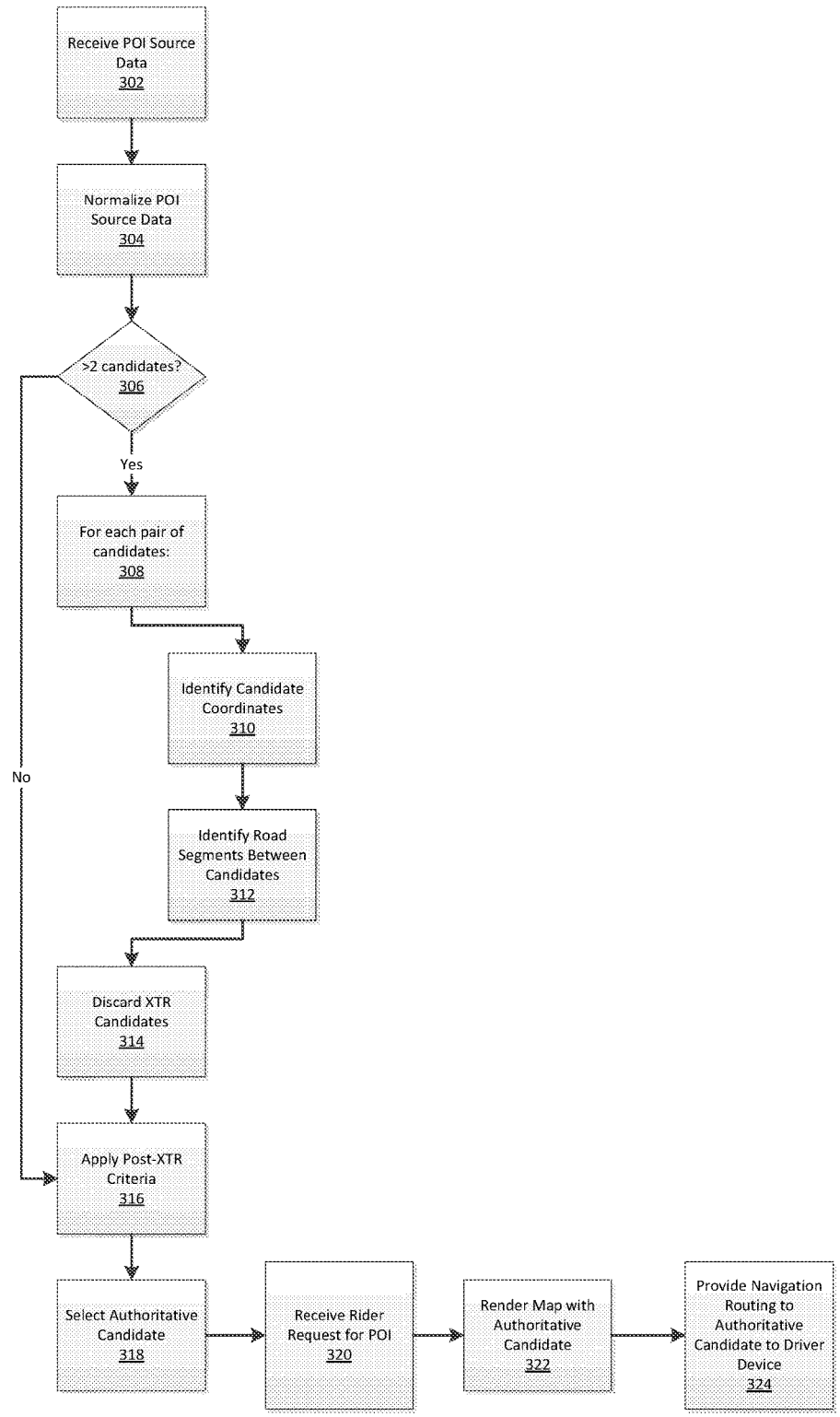
FIG. 3 illustrates a method for determining an authoritative location of a point of interest in accordance with one embodiment.

Turning to FIG. 3, we return to our example of the travel coordination system, in which a rider would like a driver to take her to the Has Bean Coffee Shop in Las Vegas. In one embodiment, a rider uses a client application on a mobile device, such as mobile device 600 described below with respect to FIG. 6. Using device 600, the rider inputs a POI identifier, which in this case is "Has Bean Coffee Shop." The request is received by navigation subsystem 212 for coordinating travel between the rider and a driver.

In one embodiment, the determination by system 200 of an authoritative POI may be done at the time a request is received by system 200 from a rider for a POI. In other embodiments, identification of an authoritative POI candidate is done prior to the point at which a request is received from a rider. For example, system 200 may process and determine authoritative candidates each time data is received from a data source 202, or may perform the processing in batch, either periodically, or once a particular number of candidates have been received. The particular timing for determination of the authoritative candidate is left to the discretion of the implementer, and for purposes of description in FIG. 3, we presume that the determination is made prior to receiving the request from the rider.

In FIG. 3, the illustrated method begins with the receipt 302 of data from the various data sources. As described above, different data providers may provide data in different formats with variation in names, address, or coordinates, and system 200 thus normalizes 304 the data to make comparison feasible.

If 306, for a particular POI, there is only one candidate location, then no further analysis need be done, as the sole candidate is the authoritative candidate. If there are exactly two candidates, then no consensus (as described below) exists, and even if the two candidates are XTR candidates, selection of the authoritative candidate is carried out using 316 post-XTR analysis criteria.

Alternatively, if 306 there are more than two candidates for the POI's location, POI location determination engine 214 identifies which, if any, candidates are XTR compared to a group of consensus candidates. To do this, for each 308 pair of candidate points, engine 214 identifies 310 the coordinates of the candidates, and identifies 312 whether at least one road segment exists between the two candidates based on their coordinates.

To determine whether or not a road segment exists between two candidates, POI location determination engine 214 uses map data from map data store 210. In one embodiment, map data is divided into multiple cells, and the cell(s) that include the coordinates of the candidates being compared are retrieved by engine 214 from map data store 210. For example, Google's S2 library enables representation of latitude and longitude within regions of defined areas (cells). A cell can be loaded into memory and its contents (e.g., road segments and other features) easily identified. Other conventional technologies for representing coordinates on the Earth also exist, as will be appreciated by those of skill in the art, and can be sufficiently adapted for use as described here.

Returning again to FIG. 1, a candidate-by-candidate cross-comparison would produce the results that each of candidates 114, 116, 118 and 120 have three other candidates that do not cross a road segment, and each has one candidate that does cross a road segment. Conversely, candidate 122 has no other candidates that are not across a road segment from it. From this analysis, we consider the largest set of candidates that do not include an XTR candidate to be a consensus set or group of candidates. In the example of FIG. 1, the consensus group includes candidates 114, 116, 118 and 120.

Figure 4:
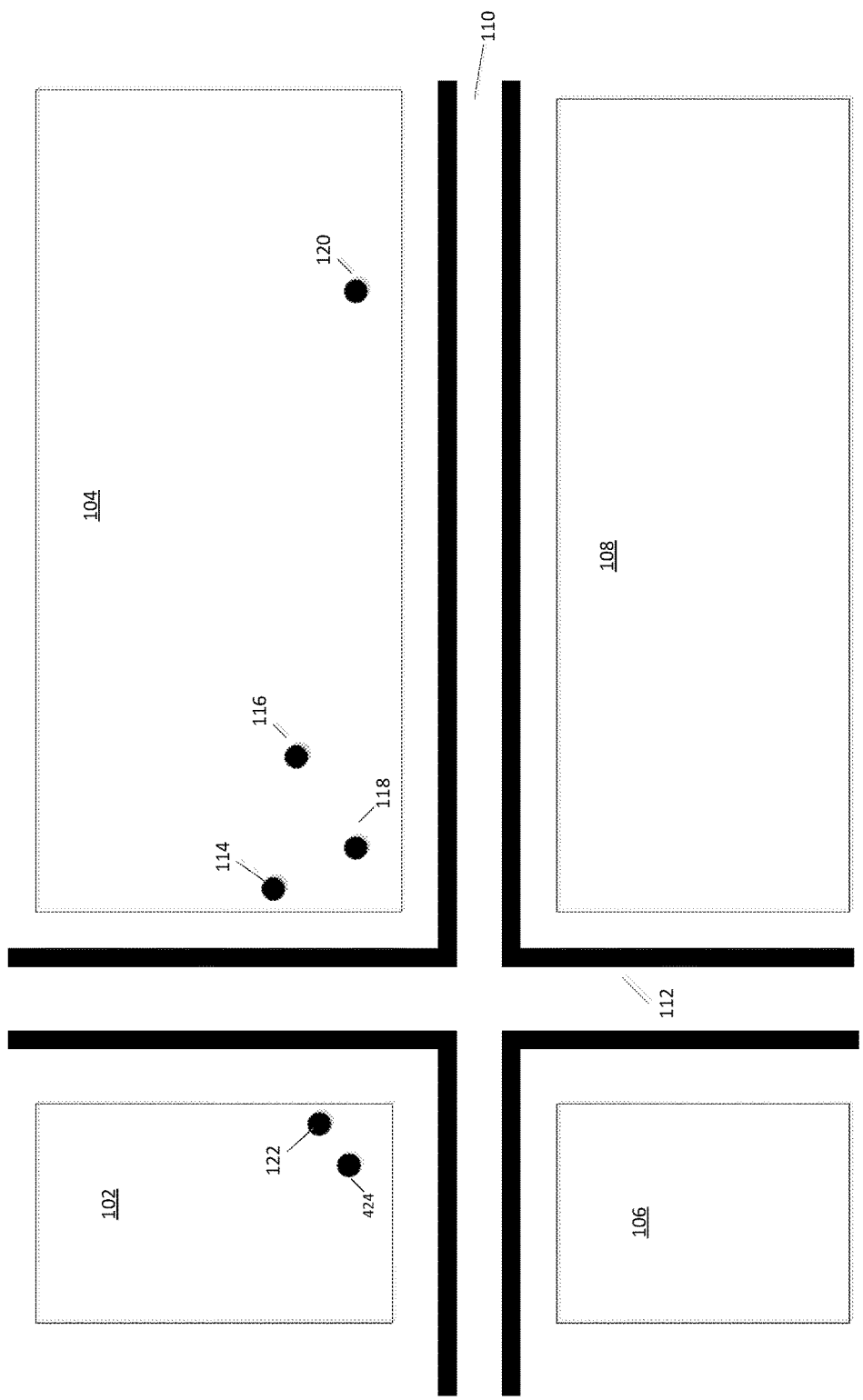
FIG. 4 illustrates an additional example of multiple potential candidate locations for a point of interest according to one embodiment.

Note that more than one candidate point can be excluded from the consensus group—for example, referring to FIG. 4, even with the addition of point 424 to block 102, the consensus group remains the set of candidates on block 104, to the exclusion of both blocks 122 and 424.

Returning again to FIG. 3, following the identification of the consensus group, candidates not within the group are discarded 314 from consideration as the authoritative candidate.

Once the consensus group has been identified and XTR candidates discarded, there still remain at least two candidates in the consensus group from which to select the authoritative candidate by applying 316 post-XTR criteria. In one embodiment, a modified outlier process is used as part of the post-XTR criteria. In that process, each POI has an associated category, such as a house, apartment building, retail establishment, hospital, sports stadium, park, and the like. For each category of POI, a maximum distance exists as a threshold, and only those candidates that are beyond the threshold distance from that consensus for that category of POI are discarded. In one embodiment, an average location is selected as a consensus location from which to measure distance to other points. For example, returning again to FIG. 1, if the POI being located is a large park, candidate 120 may be within the threshold distance for the park category of POIs, and would not be excluded as being too far from the consensus points. On the other hand, if the POI is the Has Bean Coffee Shop, point 120 may well be beyond the threshold distance for retail establishments, and thus will be excluded based on its distance. Other criteria may also be used to reduce or eliminate all but one of the remaining candidates until an authoritative candidate can be selected 318. These criteria may include, in various embodiments, the relative freshness of the data from a particular provider, in which more weight is given to data that is more recently received; as well as whether a particular data source is based on user-generated content rather than curated content. In the latter example, curated content may be given a higher (or lower) weight than data from a curated source, at the discretion of the implementer.

As noted, we have assumed for purposes of this discussion that the authoritative candidate is selected prior to receiving the rider's request for coordination of transportation to the POI. Thus, returning to FIG. 3, following selection 318 of the authoritative candidate, the rider's request is received 320. In one embodiment, the mobile device 600, executing a software application for rider-side coordination of travel requests, can display a map of the location surrounding the POI, with the authoritative candidate rendered 322 on the map. In one embodiment, system 200 then uses the navigation subsystem 212 to coordinate a ride between the rider and a driver, and in one embodiment provides 324 navigation routing to the authoritative POI location, for example by providing routing information to a driver's device.

Figure 5:
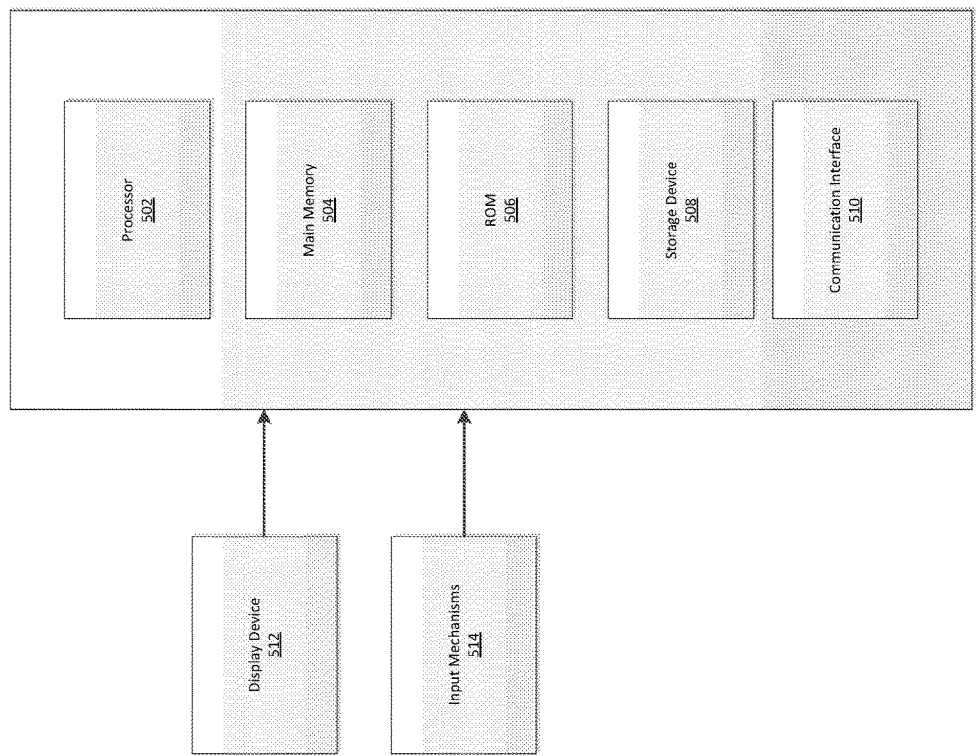
FIG. 5 is a diagram illustrating an example of a computer system upon which described embodiments may be implemented.

FIG. 5 is a diagram illustrating a computer system upon which embodiments described herein may be implemented. For example, in the context of FIG. 2, system 200 may be implemented using a computer system such as described by FIG. 5. System 200 may also be implemented using a combination of multiple computer systems as described by FIG. 5, with each computer system implementing one or more of the components of system 200. Multiple-computer-systems implementations include networked systems, such as a networked client-server system.

In one implementation, system 200 includes processing resources such as one or more processors 502, as well as main memory 504, read only memory (ROM) 506, a storage device 508, and a communication interface 510. System 200 includes the processor(s) 502 for processing information and main memory 504, such as a random access memory (RAM) or other dynamic storage device, for storing information and instructions to be executed by the processor(s) 502. Main memory 504 also may be used for storing temporary variables or other intermediate information during execution of instructions to be executed by processor(s) 502. System 200 may also include ROM 506 or other static storage device for storing static information and instructions for processor(s) 502.

The storage device 508, such as a magnetic disk or optical disk, is provided for storing information and instructions. The communication interface 510 can enable system 200 to communicate with one or more networks (e.g., cellular network) through use of the network link (wireless or wireline). Using the network link, system 200 can communicate with one or more computing devices, and one or more servers. In an example embodiment, the communication interface 510 is configured to communicate with one or more of the data sources 202, 204, 206 of FIG. 2.

In some variations, system 200 can be configured to receive sensor data (e.g., such as GPS data) from one or more location tracking devices via the network link. The sensor data can be processed by the processor 502 and can be stored in, for example, the storage device 508. The processor 502 can process the sensor data of a location tracking device in order to determine the path of travel of a transportation vehicle corresponding to the location tracking device. Extrapolated position information can be transmitted to one or more service requestor devices over the network to enable the service applications running on the service requestor devices to use the position information to present a visualization of the actual movement of the transportation vehicles.

System 200 can also include a display device 512, such as a cathode ray tube (CRT), an LCD monitor, or a television set, for example, for displaying graphics and information to a user. An input mechanism 514, such as a keyboard that includes alphanumeric keys and other keys, can be coupled to system 200 for communicating information and command selections to processor(s) 502. Other non-limiting, illustrative examples of input mechanisms 514 include a mouse, a trackball, touch-sensitive screen, or cursor direction keys for communicating direction information and command selections to processor(s) 502 and for controlling cursor movement on display device 512.

In an example embodiment, storage device 508 stores data normalizer 208, map data store 210, navigation sub-system 212, and the POI location determination engine 214 components of FIG. 2 as computer executable instructions. During operation, the processor(s) 502 executes the instructions and loads the components into main memory 504. The instructions cause the processor(s) 502 to perform the method of FIG. 3. In this way, the processor(s) 502 coupled to main memory 504, read only memory (ROM) 506, storage device 508, and communication interface 510 (as described below in greater detail) is a special-purpose processor.

Examples described herein are related to the use of system 200 for implementing the techniques described herein. According to one embodiment, those techniques are performed by system 200 in response to processor(s) 502 executing one or more sequences of one or more instructions contained in main memory 504. Such instructions may be read into main memory 504 from another machine-readable medium, such as storage device 508. Execution of the sequences of instructions contained in main memory 504 causes processor(s) 502 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
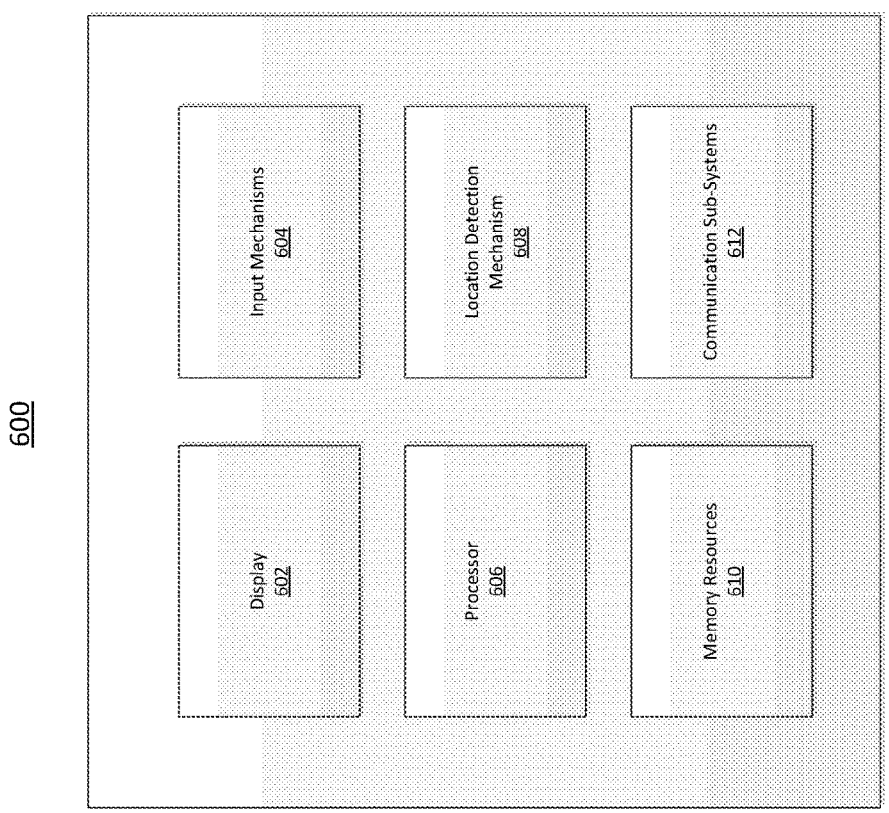
FIG. 6 is a diagram illustrating an example of a mobile computing device upon which embodiments described may be implemented.

FIG. 6 is a diagram illustrating a mobile computing device upon which embodiments described herein may be implemented as described above, for example with respect to a rider device or driver device. In one embodiment, a computing device 600 may correspond to a mobile computing device, such as a cellular device that is capable of telephony, messaging, and data services. Examples of such devices include smartphones, handsets or tablet devices for cellular carriers. Computing device 600 includes a processor 606, memory resources 610, a display device 602 (e.g., such as a touch-sensitive display device), one or more communication sub-systems 612 (including wireless communication sub-systems), input mechanisms 604 (e.g., an input mechanism can include or be part of the touch-sensitive display device), and one or more location detection mechanisms (e.g., GPS module) 608. In one example, at least one of the communication sub-systems 612 sends and receives cellular data over data channels and voice channels.

The processor 606 is configured with software and/or other logic to perform one or more processes, steps and other functions described with implementations, such as those described herein. Processor 606 is configured, with instructions and data stored in the memory resources 610, to operate a service application as described herein. For example, instructions for operating the service application in order to display user interfaces can be stored in the memory resources 610 of the computing device 600.

The processor 606 can provide content to the display 602 by executing instructions and/or applications that are stored in the memory resources 610. In some examples, one or more user interfaces can be provided by the processor 606, such as a user interface for the service application, based at least in part on the received position information of the one or more transportation vehicles. While FIG. 6 is illustrated for a mobile computing device, one or more embodiments may be implemented on other types of devices, including full-functional computers, such as laptops and desktops (e.g., PC).

In addition to the embodiments specifically described above, those of skill in the art will appreciate that the invention may additionally be practiced in other embodiments.

Within this written description, the particular naming of the components, capitalization of terms, the attributes, data structures, or any other programming or structural aspect is not mandatory or significant unless otherwise noted, and the mechanisms that implement the described invention or its features may have different names, formats, or protocols. Further, the system may be implemented via a combination of hardware and software, as described, or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required. It should be noted that the process steps and instructions of the present invention could be embodied in software, firmware or hardware, and when embodied in software, could be downloaded to reside on and be operated from different platforms used by real time network operating systems.

Algorithmic descriptions and representations included in this description are understood to be implemented by computer programs. Furthermore, it has also proven convenient at times, to refer to these arrangements of operations as modules or code devices, without loss of generality.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented are not inherently related to any particular computer or other apparatus. Various general-purpose systems may also be used with programs in accordance with the teachings above, or it may prove convenient to construct more specialized apparatus to perform the required method steps. The required structure for a variety of these systems will appear from the description above. In addition, a variety of programming languages may be used to implement the teachings above.

Finally, it should be noted that the language used in the specification Has Bean principally selected for readability and instructional purposes, and may not have been selected to delineate or circumscribe the inventive subject matter. Accordingly, the disclosure of the present invention is intended to be illustrative, but not limiting, of the scope of the invention.

We claim:

1. A computer-implemented method for providing vehicle routing guidance to a point of interest, comprising:
    receiving, by at least one processor from a plurality of data sources, at least three candidate locations for a point of interest, at least one of the received candidate locations located on a first side of a road segment and a greater number of candidate locations located on a second side of the road segment;
    identifying a consensus group including a plurality of candidate locations, no candidate in the consensus group located across a road segment from any other candidate in the consensus group;
    selecting one of the candidates in the consensus group as an authoritative candidate for the location of the point of interest; and
    providing vehicle routing guidance to the point of interest.

2. The computer-implemented method of claim 1, wherein the candidate locations received from the plurality of data sources are in different data formats, and wherein identifying the consensus group further comprises normalizing the data formats of the received candidate locations.

3. The computer-implemented method of claim 1, wherein the received candidate locations include at least two candidate locations not across any road segment from each other, and are across at least one road segment from each other received candidate location, and wherein the at least two candidate locations are not part of the consensus group.

4. The computer-implemented method of claim 1, wherein selecting one of the candidates in the consensus group as an authoritative candidate for the location of the point of interest further comprises:
    applying a refinement to the candidates in the consensus group to eliminate at least one candidate from the group; and
    selecting one of the candidates remaining in the group as the authoritative candidate.

5. The computer-implemented method of claim 4, wherein the point of interest is associated with a point of interest category, and the point of interest category has associated with it a distance threshold, and wherein applying the refinement further comprises:
    identifying at least one candidate in the consensus group that is more than the threshold distance from the consensus group; and
    eliminating the identified at least one candidate from the consensus group.

6. The computer-implemented method of claim 5, wherein the at least one candidate in the consensus group is more than the threshold distance from the consensus group if a distance from the at least one candidate to an average location of the other candidates in the consensus group is greater than the threshold distance.

7. A computer program product for providing vehicle routing guidance to a point of interest, the computer program product stored on a non-transitory computer-readable medium and including instructions that when executed cause a processor to carry out steps comprising:
    receiving, by at least one processor from a plurality of data sources, at least three candidate locations for a point of interest, at least one of the received candidate locations located on a first side of a road segment and a greater number of candidate locations located on a second side of the road segment;
    identifying a consensus group including a plurality of candidate locations, no candidate in the consensus group located across a road segment from any other candidate in the consensus group;
    selecting one of the candidates in the consensus group as an authoritative candidate for the location of the point of interest; and
    providing vehicle routing guidance to the point of interest.

8. The computer program product of claim 7, wherein the candidate locations received from the plurality of data sources are in different data formats, and wherein identifying the consensus group further comprises normalizing the data formats of the received candidate locations.

9. The computer program product of claim 7, wherein the received candidate locations include at least two candidate locations not across any road segment from each other, and are across at least one road segment from each other received candidate location, and wherein the at least two candidate locations are not part of the consensus group.

10. The computer program product of claim 7, wherein selecting one of the candidates in the consensus group as an authoritative candidate for the location of the point of interest further comprises:
    applying a refinement to the candidates in the consensus group to eliminate at least one candidate from the group; and
    selecting one of the candidates remaining in the group as the authoritative candidate.

11. The computer program product of claim 10, wherein the point of interest is associated with a point of interest category, and the point of interest category has associated with it a distance threshold, and wherein applying the refinement further comprises:
    identifying at least one candidate in the consensus group that is more than the threshold distance from the consensus group; and
    eliminating the identified at least one candidate from the consensus group.

12. The computer program product of claim 11, wherein the at least one candidate in the consensus group is more than the threshold distance from the consensus group if a distance from the at least one candidate to an average location of the other candidates in the consensus group is greater than the threshold distance.

13. A system for providing vehicle routing guidance to a point of interest, comprising:
    at least one processor;
    a data normalizer module, executed by the processor, configured to receive from a plurality of data sources at least three candidate locations for a point of interest, at least one of the received candidate locations located on a first side of a road segment and a greater number of candidate locations located on a second side of the road segment;
    a point-of-interest location determine engine, executed by the processor, configured to:
        identify a consensus group of a plurality of candidate locations, no candidate in the consensus group located across a road segment from any other candidate in the consensus group; and select one of the candidates in the consensus group as an authoritative candidate for the location of the point of interest; and a navigation subsystem, coupled to the POI location determination engine, adapted to provide vehicle routing guidance to the point of interest.

14. The system of claim 13 wherein the navigation subsystem is further configured to render a map including the point of interest rendered at the location of the authoritative candidate.

15. The system of claim 13, wherein the candidate locations received from the plurality of data sources are in different data formats, and wherein identifying the consensus group further comprises normalizing the data formats of the received candidate locations.

16. The system of claim 13, wherein the received candidate locations include at least two candidate locations not across any road segment from each other, and are across at least one road segment from each other received candidate location, and wherein the at least two candidate locations are not part of the consensus group.

17. The system of claim 13, wherein in selecting one of the candidates in the consensus group as an authoritative candidate for the location of the point of interest, the point-of-interest location determination engine is further adapted to:

apply a refinement to the candidates in the consensus group to eliminate at least one candidate from the group; and select one of the candidates remaining in the group as the authoritative candidate.

18. The system of claim 17, wherein the point of interest is associated with a point of interest category, and the point of interest category has associated with it a distance threshold, and wherein applying the refinement further comprises:

identifying at least one candidate in the consensus group that is more than the threshold distance from the consensus group; and eliminating the identified at least one candidate from the consensus group.

19. The system of claim 18, wherein the at least one candidate in the consensus group is more than the threshold distance from the consensus group if a distance from the at least one candidate to an average location of the other candidates in the consensus group is greater than the threshold distance.

20. A computer-implemented method for providing vehicle routing guidance to a point of interest, comprising:

receiving, by at least one processor from a plurality of data sources, at least three candidate locations for a point of interest, at least one of the received candidate locations located on a first side of a road segment and a greater number of candidate locations located on a second side of the road segment;

identifying a consensus group of a plurality of candidate locations, the consensus group located on the second side of the road segment;

selecting one of the candidates in the consensus group as an authoritative candidate for the point of interest;

rendering a map of an area surrounding the point of interest, the authoritative candidate rendered on the map; and providing vehicle routing guidance to the point of interest.

* * * * *